US012769149B2

(12) United States Patent
Qi

(10) Patent No.: US 12,769,149 B2
(45) Date of Patent: Oct. 20, 2026

(54) EYEGLASS LENS, METHOD FOR MANUFACTURING EYEGLASS LENS, AND EYEGLASS LENS COATING FILM

(71) Applicant: HOYA LENS THAILAND LTD., Pathumthani (TH)

(72) Inventor: Hua Qi, Tokyo (JP)

(73) Assignee: HOYA LENS THAILAND LTD., Pathumthani (TH)

(*) Notice: Subject to any disclaimer, the term of this patent is extended or adjusted under 35 U.S.C. 154(b) by 1109 days.

(21) Appl. No.: 17/270,678

(22) PCT Filed: Aug. 29, 2019

(86) PCT No.: PCT/JP2019/033905
§ 371 (c)(1),
(2) Date: Feb. 23, 2021

(87) PCT Pub. No.: WO2020/045567
PCT Pub. Date: Mar. 5, 2020

(65) Prior Publication Data

US 2021/0341751 A1 Nov. 4, 2021

(30) Foreign Application Priority Data

Aug. 31, 2018 (JP) ................................ 2018-162424

(51) Int. Cl.
*G02C 7/06* (2006.01)
*G02C 7/02* (2006.01)
*G02C 7/10* (2006.01)

(52) U.S. Cl.
CPC ............... *G02C 7/024* (2013.01); *G02C 7/06* (2013.01); *G02C 7/10* (2013.01); *G02C 2202/20* (2013.01); *G02C 2202/24* (2013.01)

(58) Field of Classification Search
CPC ............ G02C 7/024; G02C 7/06; G02C 7/10
(Continued)

(56) References Cited

U.S. PATENT DOCUMENTS 5,245,367 A * 9/1993 Miller .................... G02C 7/046 351/159.41
10,429,670 B2 * 10/2019 Newman ................ G02C 7/049
(Continued)

FOREIGN PATENT DOCUMENTS

WO WO-2011106837 A1 * 9/2011 ............... G02C 7/04
WO 2018026697 A1 2/2018
WO 2018076057 A1 5/2018

OTHER PUBLICATIONS

Meister, Darryl, and James E Sheedy. Introduction to Ophthalmic Optics. Carl Zeiss Vision, 2008. (Year: 2008).*
(Continued)

*Primary Examiner* — Zachary W Wilkes
(74) *Attorney, Agent, or Firm* — Oliff PLC

(57) ABSTRACT

Provided are an eyeglass lens 1 that is configured such that a pencil of rays that has entered from an object-side surface 3 passes through the eye and converges at a position A on the retina after being emitted from an eyeball-side surface 4 and in which a function of causing a pencil of rays to converge at a position B that is different from the position A in a light traveling direction is added to the surface of a lens substrate portion 2, and techniques associated with the eyeglass lens 1.

13 Claims, 6 Drawing Sheets

(58) Field of Classification Search
USPC ........................................ 351/159.41, 159.44
See application file for complete search history.

(56) References Cited

U.S. PATENT DOCUMENTS

| | | | | |
|---|---|---|---|---|
| 10,571,717 | B2 * | 2/2020 | Neitz | B29D 11/00326 |
| 10,845,619 | B2 * | 11/2020 | Mappes | B29D 11/00028 |
| 2004/0230299 | A1 * | 11/2004 | Simpson | A61F 2/1613 623/6.11 |
| 2005/0105047 | A1 * | 5/2005 | Smitth, III | G02C 7/04 351/159.07 |
| 2006/0082729 | A1 * | 4/2006 | To | G02B 5/1895 351/159.06 |
| 2010/0161051 | A1 * | 6/2010 | Hong | A61F 2/1618 351/159.01 |
| 2012/0194780 | A1 * | 8/2012 | Back | G02C 7/041 351/159.73 |
| 2016/0306192 | A1 * | 10/2016 | Marshall | G02B 3/0043 |
| 2017/0131567 | A1 | 5/2017 | To et al. | |
| 2017/0184875 | A1 * | 6/2017 | Newman | G02C 7/022 |
| 2019/0033619 | A1 * | 1/2019 | Neitz | G02C 7/02 |
| 2019/0072786 | A1 * | 3/2019 | Krause | G02B 1/115 |
| 2019/0146242 | A1 * | 5/2019 | Mappes | B33Y 80/00 351/159.48 |
| 2020/0393702 | A1 * | 12/2020 | Guillot | G02C 7/086 |
| 2021/0354409 | A1 * | 11/2021 | Guillot | B29D 11/00317 |
| 2021/0356763 | A1 * | 11/2021 | Le Saux | G02C 7/022 |

OTHER PUBLICATIONS

EP19853670.8, "Extended European Search Report", May 10, 2022, 7 pages.

PCT/JP2019/033905, "International Preliminary Report on Patentability", Mar. 2, 2021, 7 pages.

PCT/JP2019/033905, English Translation of International Search Report, Oct. 15, 2019, 2 pages.

* cited by examiner

EYEGLASS LENS, METHOD FOR MANUFACTURING EYEGLASS LENS, AND EYEGLASS LENS COATING FILM

CROSS-REFERENCE TO RELATED APPLICATIONS

This application is a National Stage of International Application No. PCT/JP2019/033905, filed Aug. 29, 2019, which claims priority to Japanese Patent Application No. 2018-162424, filed Aug. 31, 2018, and the contents of which is incorporated by reference.

TECHNICAL FIELD

The present disclosure relates to an eyeglass lens, a method for manufacturing an eyeglass lens, and an eyeglass lens coating film.

BACKGROUND ART

Patent Document 1 discloses an eyeglass lens for suppressing the progress of a refractive error such as near-sightedness. Specifically, for example, a spherical minute convex portion (a substrate convex portion in this specification) with a diameter of about 1 mm is formed on a convex surface, which is the object-side surface of the eyeglass lens. With an eyeglass lens, normally, a pencil of rays that has entered from the object-side surface is emitted from the eyeball-side surface and thus are focused on the wearer's retina (a predetermined position A in this specification). On the other hand, a pencil of rays that has passed through the minute convex portion is focused at a position that is closer to the object than the retina of the wearer is. As a result, the progress of near-sightedness is suppressed.

CITATION LIST

Patent Document

Patent Document 1: US Publication No. 2017/0131567

SUMMARY OF DISCLOSURE

Technical Problem

As a result of intensive studies conducted by the inventor of the present disclosure, the following new problems are revealed.

In Patent Document 1, the minute convex portion is formed on a lens substrate. On the other hand, if retrofitting can be used to impart an effect of suppressing the progress of near-sightedness to a conventional eyeglass lens in which no minute convex portion is formed on a lens substrate, the versatility of an eyeglass lens having the function disclosed in Patent Document 1 is enhanced, and thus many people can enjoy the effects provided by the eyeglass lens.

Moreover, when a minute convex portion is formed on a lens substrate as in Patent Document 1, the material of the lens substrate is limited depending on the manufacturing method. For example, when a lens substrate is manufactured through injection molding, the material thereof is limited to a thermoplastic resin, and thus only a material with a low refractive index can be selected in some cases.

One embodiment of the present disclosure aims to provide a technique by which the effect of suppressing the progress of near-sightedness or far-sightedness (collectively referred to as "refractive error" hereinafter in this specification) can be sufficiently exhibited without a need to depend on the material of a lens substrate or the surface shape thereof.

Solution to Problem

The inventor of the present disclosure conducted intensive studies to resolve the above-mentioned problems. As a result, the inventor found that, if a lens substrate is coated with a coating film that is formed in a shape that enables the effect of suppressing the progress of a refractive error to be sufficiently exhibited, then the effect of suppressing the progress of the refractive error can be sufficiently exhibited without a need to depend on the material of the lens substrate or the surface shape thereof.

The present disclosure was made based on the above-mentioned finding.

A first aspect of the present disclosure is an eyeglass lens configured such that a pencil of rays that has entered from an object-side surface passes through an eye and converges at a position A on a retina after being emitted from an eyeball-side surface, wherein a function of causing a pencil of rays to converge at a position B that is different from the position A in a light traveling direction is added to a surface of a lens substrate portion.

A second aspect of the present disclosure is the aspect according to the first aspect, in which the lens substrate portion is coated with a coating film provided with a plurality of defocusing areas that cause a pencil of rays to converge at the position B.

A third aspect of the present disclosure is the aspect according to the second aspect, in which the coating film is a transparent layer made of a material that is different from a material of a lens substrate in the lens substrate portion.

A fourth aspect of the present disclosure is the aspect according to the second or third aspect, in which each of the defocusing areas includes a plurality of concentric annular ring zones, and steps are formed between the adjacent ring zones.

A fifth aspect of the present disclosure is the aspect according to the fourth aspect, in which the plurality of concentric annular ring zones are arranged to form a Fresnel pattern.

A sixth aspect of the present disclosure is the aspect according to the fourth aspect, in which the plurality of concentric annular ring zones are arranged to form a diffraction pattern.

A seventh aspect of the present disclosure is the aspect according to the second aspect, in which the coating film is constituted by a transparent sheet made of a material that is different from a material of a lens substrate in the lens substrate portion.

An eighth aspect of the present disclosure is the aspect according to any one of the second to seventh aspects, in which an antireflection film is arranged on an outermost surface of the coating film that is not opposed to the lens substrate portion.

A ninth aspect of the present disclosure is the aspect according to any one of the second to eighth aspects, in which the defocusing areas that cause a pencil of rays to converge at the position B that is different from the position A are not formed on a surface of a lens substrate in the lens substrate portion.

A tenth aspect of the present disclosure is a method for manufacturing an eyeglass lens configured such that a pencil of rays that has entered from an object-side surface passes through an eye and converges at a position A on a retina after being emitted from an eyeball-side surface, the method comprising an addition step of adding a function of causing a pencil of rays to converge at a position B that is different from the position A in a light traveling direction to an outermost surface of a lens substrate portion.

An eleventh aspect of the present disclosure is the aspect according to the tenth aspect, in which the addition step is a coating step of coating the lens substrate portion with a coating film provided with a plurality of defocusing areas that cause a pencil of rays to converge at the position B that is different from the position A.

A twelfth aspect of the present disclosure is the aspect according to the eleventh aspect, in which the coating film is a transparent sheet, and the sheet is bonded to the lens substrate portion in the coating step.

A thirteenth aspect of the present disclosure is a coating film for an eyeglass lens configured such that a pencil of rays that has entered from an object-side surface passes through an eye and converges at a position A on a retina after being emitted from an eyeball-side surface, the coating film being provided with a plurality of defocusing areas that cause a pencil of rays to converge at a position B that is different from the position A in a light traveling direction.

Advantageous Effects of Disclosure

With an embodiment of the present disclosure, the effect of suppressing the progress of a refractive error can be sufficiently exhibited without a need to depend on the material of a lens substrate or the surface shape thereof.

DESCRIPTION OF EMBODIMENTS

The following describes embodiments of the present disclosure. The description below with reference to the drawings is exemplary, and the present disclosure is not limited to the aspects that are described as examples.

Figure 1:
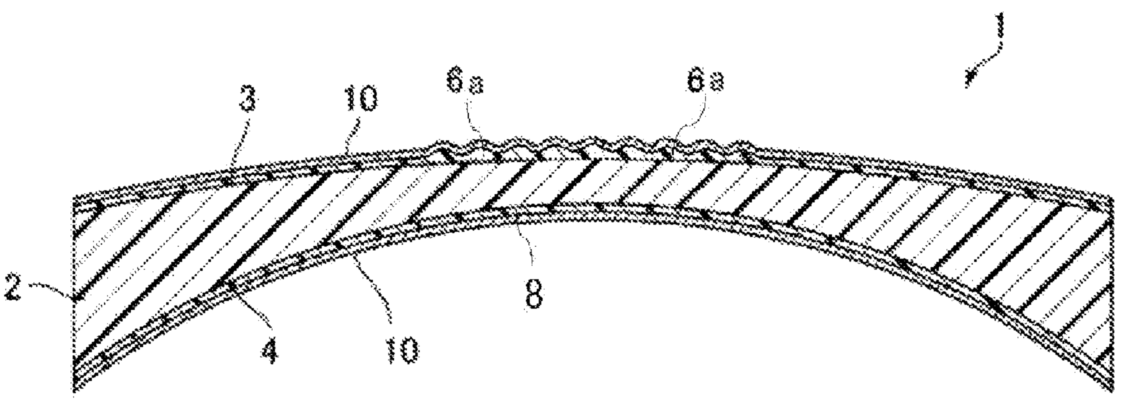
FIG. 1 is a schematic cross-sectional view showing an example in which an island-shaped coating-film convex portion, which is an example of a defocusing area, is employed in an eyeglass lens according to an aspect of the present disclosure.

FIG. 1 is a schematic cross-sectional view showing an example in which island-shaped coating-film convex portions 6*a*, which are examples of defocusing areas 6, are employed in an eyeglass lens 1 according to an aspect of the present disclosure.

An example is shown in FIG. 1 in which an object-side surface 3 is a convex surface, and an eyeball-side surface 4 is a concave surface (an example of a so-called meniscus lens).

Eyeglass Lens 1 According to Aspects of Present Disclosure

The eyeglass lens 1 according to an aspect of the present disclosure is configured as follows.

"An eyeglass lens configured such that a pencil of rays that has entered from an object-side surface passes through an eye and converges at a position A on a retina after being emitted from an eyeball-side surface, wherein a function of causing a pencil of rays to converge at a position B that is different from the position A in a light traveling direction is added to a surface (specifically an outermost surface) of a lens substrate portion."

The eyeglass lens 1 shown in FIG. 1 is configured such that the position B is located closer to the object than the position A is, and exhibits an effect of suppressing the progress of near-sightedness.

With the above-mentioned configuration, retrofitting can be used to impart an effect of suppressing the progress of a refractive error (an effect of suppressing the progress of near-sightedness in the case of the eyeglass lens 1 shown in FIG. 1) to a conventional eyeglass lens in which a known lens substrate 2A or a lens substrate 2A provided with a known coating film (e.g., a hard coating film 8) (collectively referred to as a "lens substrate portion 2" hereinafter) does not have a function of causing a pencil of rays to converge at the position B, which is closer to the object, separate from a function of causing a pencil of rays to converge for fulfilling the wearer's prescription. As a result, the versatility of the eyeglass lens 1 having the function disclosed in Patent Document 1 is enhanced, and thus many people can enjoy the effects provided by the eyeglass lens 1.

More specifically, an eyeglass lens 1 according to an aspect of the present disclosure having the above-mentioned configuration is configured as follows.

"An eyeglass lens configured such that a pencil of rays that has entered from an object-side surface passes through an eye and converges at a position A on a retina after being emitted from an eyeball-side surface, wherein the lens substrate portion is coated with a coating film provided with a plurality of defocusing areas that cause a pencil of rays to converge at a position B that is different from the position A in a light traveling direction."

Here, the defocusing area has a function of defocusing, in a plus or minus direction, a pencil of rays that passes therethrough and causing the pencil of rays to converge at a position that is different from a position at which light that passes through the base portion converges.

That is, an aspect of the above-mentioned addition of a function is to coat the lens substrate portion with a coating film provided with a plurality of defocusing areas. The above-mentioned "addition" of a function means that the above-mentioned function of causing a pencil of rays to converge at the position B is newly added to a lens substrate portion 2 that is not provided, or is incompletely provided, with the function of causing a pencil of rays to converge at the position B (the function of causing a pencil of rays to converge at the position B is not provided in a specific example).

With the above-mentioned configuration, retrofitting can be used to impart the effect of suppressing the progress of a refractive error to a conventional eyeglass lens in which the lens substrate 2A is not provided with the defocusing areas. As a result, the versatility of the eyeglass lens 1 having the function disclosed in Patent Document 1 is enhanced, and thus many people can enjoy the effects provided by the eyeglass lens 1.

Moreover, unlike Patent Document 1, there is no need to manufacture, using a special method, a lens in which a lens substrate 2A is provided with minute convex portions, and thus there is no limitation on the material of the lens substrate 2A. This means that the types of refractive index of the lens substrate 2A can be increased, and that eyeglass lenses 1 to which the effect of suppressing the progress of near-sightedness is imparted can be provided to users with various prescriptions.

Moreover, as described in Patent Document 1, a configuration may be employed in which minute convex portions are formed on a lens substrate 2A. The reason for this is as follows.

In the case where the defocusing areas 6 (substrate convex portions 2*a*) are previously formed on the surface of the lens substrate 2A, when the lens substrate 2A is coated with a hard coating film 8 (shown in FIGS. 6A-6C) such that the hard coating film 8 is in contact with the lens substrate 2A, for example, the protruding lengths of the substrate convex portions 2*a* on the lens substrate 2A are reduced due to the influence of the coating film (i.e., the substrate convex portions 2A are flattened). If a coating film is not provided, the focus position will be located at a position that is closer to the object than the position A is due to the substrate convex portions 2*a*.

However, in the case where a coating film is provided on the lens substrate 2A, whether or not the focus position for this lens substrate portion 2 is located at a position that is the same as that for the substrate convex portions 2*a* or the vicinity thereof depends on the shape of the outermost surface of the coating film. For that reason, forming the defocusing areas 6 on the coating film and coating the lens substrate 2A, a hard coating film 8 thereon, or the like with the coating film makes it possible to cause the focus position to be located at a position that is closer to the object than the position A is.

With an aspect of the present disclosure, the effect of suppressing the progress of nearsightedness can be sufficiently exhibited without a need to depend on the material of the lens substrate 2A or the surface shape thereof.

Details of Configuration of Eyeglass Lens 1 According to Aspect of Present Disclosure The following describes further specific examples, preferred examples, and modified examples of an aspect of the present disclosure, and also describes the details of the configuration of the eyeglass lens 1 according to an aspect of the present disclosure.

The "defocusing area 6" in an aspect of the present disclosure is an independent island-shaped area formed over 360 degrees on the outermost surface of the eyeglass lens 1 and has a function of causing a pencil of rays to converge a convergence position B. The "area formed over 360 degrees" may be a fine convex portion (independent island-shaped portion) as described in Patent Document 1 or a concentric annular area that includes a plurality of ring zones and is provided with steps extending in a light traveling direction between the adjacent ring zones, or the independent island-shaped portion and the concentric annular area may coexist (some defocusing areas 6 are constituted by the independent island-shaped portions, and the other defocusing areas 6 are constituted by the concentric annular areas). Hereinafter, the fine convex portion (independent island-shaped portion) is referred to as an "island-shaped coating-film convex portion 6*a*", and the concentric annular area that includes a plurality of ring zones and is provided with steps extending in a light traveling direction between the adjacent ring zones is referred to as a "concentric annular portion 6*b*".

In the case where the island-shaped coating-film convex portion 6*a* is employed, one island-shaped coating-film convex portion 6*a* constitutes one defocusing area 6. On the other hand, in the case where the concentric annular portion 6*b* is employed, which is a concentric annular area including a plurality of ring zones, the area that is surrounded over 360 degrees by the outer circumference of the ring zone located at the outermost edge, out of the plurality of ring zones, is taken as the defocusing area 6.

If the defocusing area 6 is formed of a plurality of concentric annular ring zones, namely the concentric annular portion 6*b*, a Fresnel pattern or diffraction pattern formed by the plurality of ring zones serves a focusing function. Therefore, it is preferable that the defocusing area 6 is formed of the concentric annular portion 6*b* because this makes it possible to reduce the maximum protruding length of the defocusing area 6 or to completely embed the defocusing area 6 in the coating film unlike the case where one island-shaped portion is formed. If the protruding length is large, an effort to keep the protruding amount in subsequent processes, for example, by providing a hard coating on the surface of the coating film will need to be made, leading to an increase in quality control problems.

The maximum protruding length of the ring zones refers to the protruding length of the ring zone having the maximum protruding length among the plurality of ring zones. The protruding length is a length in an optical axis direction (lens thickness direction, Z axis) between the base portion of the outermost surface shape of the eyeglass lens 1 and the apex of the defocusing area 6. If the entire defocusing area 6 is recessed from the base portion, the maximum protruding length will be taken as zero. It should be noted that the definition of the protruding length can also be applied to the case where the island-shaped coating-film convex portion 6*a* is employed as the defocusing area 6.

It should be noted that, in both the case where the independent island-shaped portion is employed and the case where a plurality of concentric annular ring zones are employed, the defocusing area 6 causes a pencil of rays to converge at the position B, which is different from the position A in a light traveling direction.

Incidentally, when the concentric annular portion 6*b* including a plurality of concentric annular ring zones is employed as the defocusing area 6, the concentric annular ring zones cause a pencil of rays to converge at the position B, which is different from the position A. At this time, it is preferable to arrange the concentric annular ring zones on the coating film such that the ring zones form a Fresnel pattern.

Figure 2:
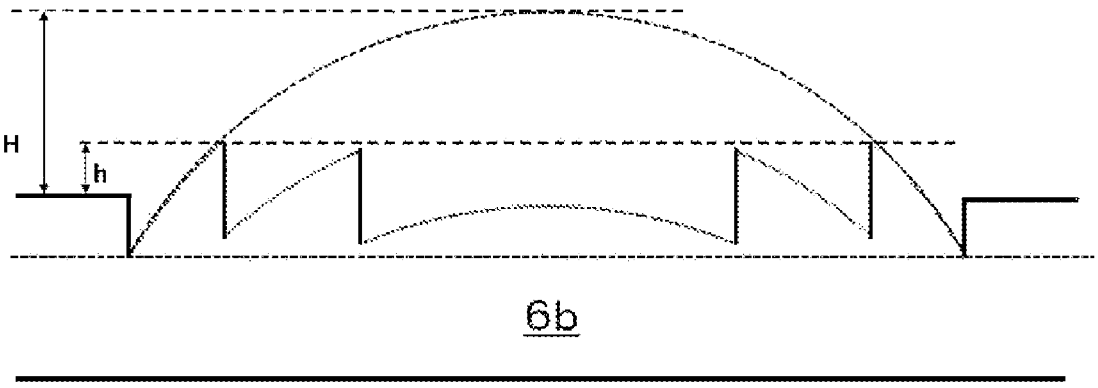
FIG. 2 is a schematic cross-sectional view of a concentric annular portion as an example of the defocusing area that includes a plurality of ring zones forming a Fresnel pattern and constitutes one defocusing area in an example in which the concentric annular portion is employed in an eyeglass lens according to an aspect of the present disclosure.

FIG. 2 is a schematic cross-sectional view of the concentric annular portion 6*b* that forms a Fresnel pattern and constitutes one defocusing area 6 in an example in which the concentric annular portion 6*b* is employed in the eyeglass lens 1 according to an aspect of the present disclosure.

This makes it possible to reduce the maximum protruding length of the defocusing area 6 to a relatively small one (H to h in FIG. 2).

The "Fresnel pattern" as used herein refers to a structure obtained by dividing one spherical surface shape into a plurality of concentric rings and arranging them such that they form steps in a cross-sectional view, and this Fresnel pattern has a refractive power equivalent to that of the original spherical surface.

The concentric annular ring zones also include ring zones forming a diffraction pattern other than those forming a Fresnel pattern. The "diffraction pattern" is a pattern in which the intervals between the concentric annular ring zones are strictly determined, and the heights and shapes of the steps between the ring zones are determined so as to intensify light passing between the ring zones due to interference. This makes it possible to achieve focusing without a phase difference unlike the case where a Fresnel pattern is employed.

When a diffraction pattern is employed, it is preferable that the diffraction pattern is blazed for a wavelength of visible light. "Blazing" refers to setting the difference in an optical path length between the ring zones to be the same as a specific wavelength. This can increase diffraction efficiency. For example, the following shows the diffraction efficiencies of primary light, namely light that converges at the position B, when blazing for a wavelength of 534 nm is performed.

Blue: 420 nm . . . 87%

Green: 534 nm . . . 100%

Red: 650 nm . . . 84%

A half of light other than the primary light serves as zero-order light and converges at the position A, whereas the other half serves as secondary light and converges at a position that is farther away from the position A than the position B is. The presence of the zero-order light and secondary light reduces the ratio (convergence efficiency) of a portion of a pencil of rays that converges at the position B to the entirety thereof. In order to obtain an appropriate convergence efficiency, it is preferable to adjust the occupancy ratio of the defocusing areas depending on the diffraction efficiency.

Figures 7A, 7B:
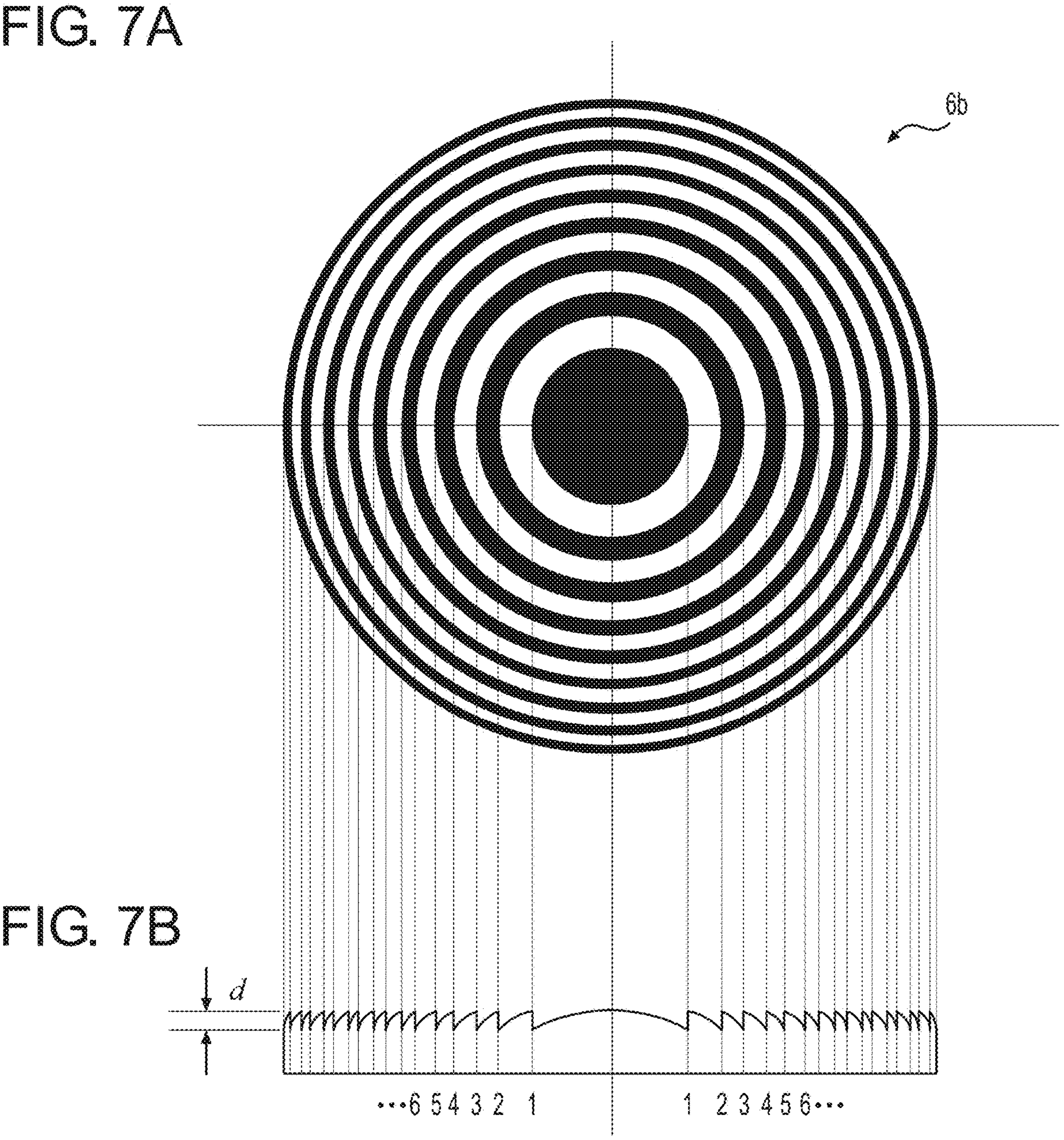
FIGS. 7A-7B show a schematic plan view (FIG. 7A) and a schematic cross-sectional view (FIG. 7B) of a concentric annular portion as an example of the defocusing area that includes a plurality of ring zones forming a diffraction pattern and constitutes one defocusing area in an example in which the concentric annular portion is employed in an eyeglass lens according to an aspect of the present disclosure.

FIGS. 7A-7B show a schematic plan view (FIG. 7A) and a schematic cross-sectional view (FIG. 7B) of a concentric annular portion 6*b* that forms a diffraction pattern and constitutes one defocusing area 6 in an example in which the concentric annular portion 6*b* is employed in an eyeglass lens 1 according to an aspect of the present disclosure.

There is no particular limitation on the shapes and arrangement of the ring zones included in the concentric annular portion 6*b* as long as the concentric annular portion 6*b* can cause a pencil of rays to converge at the position B. In both the case where a Fresnel pattern is formed (FIG. 2) and the case where a diffraction pattern is formed (FIGS. 7A-7B), known techniques that are used for conventional progressive multifocal contact lenses and conventional Fresnel-type multifocal lenses (and, in addition, the principle of pickup lenses and the like) may be applied to the shapes and arrangement of the ring zones.

Because the power (defocusing amount) of a diffraction pattern is determined depending on only the widths of the ring zones, the focusing accuracy can be maintained without an influence of the heights of the steps, which are likely to have manufacturing errors.

An antireflection film 10 may be arranged on the outermost surface of the defocusing area 6 of the above-mentioned coating film that is not opposed to the lens substrate 2A. That is, the outermost surface of the coating film may be constituted by the antireflection film 10. It should be noted that the hard coating film 8 or another film may be provided on the side of the coating film that comes into contact with the lens substrate 2A, while the antireflection film 10 is arranged on the outermost surface of the coating film. The above-mentioned coating film may be provided on the lens substrate 2A that has been provided with the hard coating film 8. Needless to say, the hard coating film 8 may be provided on the side that is not provided with the above-mentioned coating film, namely the eyeball-side surface 4, as shown in FIG. 1.

Ultimately, there is no particular limitation on the coating film according to an aspect of the present disclosure as long as the coating film can add a function of causing a pencil of rays to converge at the position B, which is different from the position A in a light traveling direction, to the outermost surface of the lens substrate portion. Therefore, the coating film according to an aspect of the present disclosure may be provided on the lens substrate portion 2 (including the lens substrate 2A and the hard coating film 8). The above-mentioned coating film may be a transparent layer made of a material different from that of the lens substrate.

It should be noted that, in the case where a transparent sheet made of a material different from that of the lens substrate is used as the above-mentioned coating film, a technique called "imprinting" may be used in manufacturing of the coating film, for example. In short, imprinting is a technique in which μm-to-nm order convex portions and concave portions formed on a master plate are pressed against a film or the like and thus transferred thereto. A sheet to which the convex portions and concave portions on the master plate are transferred can also be obtained by using a photo-curable resin or a thermosetting resin instead of a film. If a desired shape cannot be obtained by one round of transfer, a desired shape may be obtained by preparing a plurality of master plates provided with different convex portions and concave portions and successively pressing the master plates against a film or the like. In the case where imprinting is employed, it is conceivable that a flat sheet-like film may be difficult to fit to a curved surface of the lens substrate 2A. Therefore, a configuration may also be employed in which a film is processed in advance so as to have a curved shape similar to the curved shape of the lens substrate 2A, and the defocusing area 6 is formed through imprinting on the convex surface of the curved surface. It should be noted that several types of films having different curved shapes may be prepared because there are many types of eye glass lenses 1 that have different base curves.

In the case where a transparent sheet made of a material different from that of the lens substrate is used as the above-mentioned coating film, the coating film can be added to the lens substrate by forming, through imprinting, the defocusing area on a film made of, for example, cellulose triacetate or polycarbonate and then bonding the film to the lens substrate 2A or a lens obtained by providing the hard coating film 8 on the lens substrate 2A.

The above description states that employing the concentric annular portion 6*b* forming a Fresnel pattern is advantageous because the maximum protruding length of the defocusing area 6 can be reduced, but using imprinting brings about other advantages.

In the case where the island-shaped coating-film convex portion 6*a* is employed, the maximum protruding length is large. Therefore, when the island-shaped coating-film convex portions 6*a* are formed through imprinting, a remainder of the coating film other than the island-shaped coating-film convex portions 6*a* is large. This may result in a risk that there will no longer be room for a large amount of the material corresponding to the remainder. As a result, the material for the remainder moves to a portion on which the island-shaped coating-film convex portion 6*a* should not be formed under an ordinary condition, and thus an unintended change in the shape may occur in the obtained coating film.

On the contrary, in the case where the concentric annular portion 6*b* is employed, the maximum protruding length need not be as large as that in the case of the island-shaped coating-film convex portion 6*a*. Therefore, a remainder of the coating film other than the concentric annular portions 6*b* is relatively small. Due to this, the material that moves to a portion on which the concentric annular portions 6*b* should not be formed is reduced, and thus an unintended change in the shape can be prevented from occurring in the obtained coating film.

In addition to imprinting, a technique may also be employed in which photolithography is used to perform processing to form convex portions and concave portions on a sheet-like coating film material, that is, a portion other than portions to be formed into convex portions is removed through etching.

Case where Island-Shaped Coating-Film Convex Portion 6*a* is Employed

The following describes the case where the island-shaped coating-film convex portion 6*a* is employed in an eyeglass lens 1 according to an aspect of the present disclosure with reference to FIG. 1, which is described above.

The eyeglass lens 1 according to an aspect of the present disclosure includes the object-side surface 3 and the eyeball-side surface 4. The "object-side surface 3" is the surface that is located on the object side when a wearer wears the glasses including the eyeglass lens 1. The "eyeball-side surface 4" is the surface that is located on the opposite side, that is, the eyeball side, when the wearer wears the glasses including the eyeglass lens 1.

With the eyeglass lens 1 according to an aspect of the present disclosure, similarly to a conventional eyeglass lens, the base portion other than the island-shaped coating-film convex portion 6*a* functions to cause a pencil of rays that has entered from the object-side surface 3 to converge at the position A on the retina after being emitted from the eyeball-side surface 4 and passing through the eye.

Figure 3:
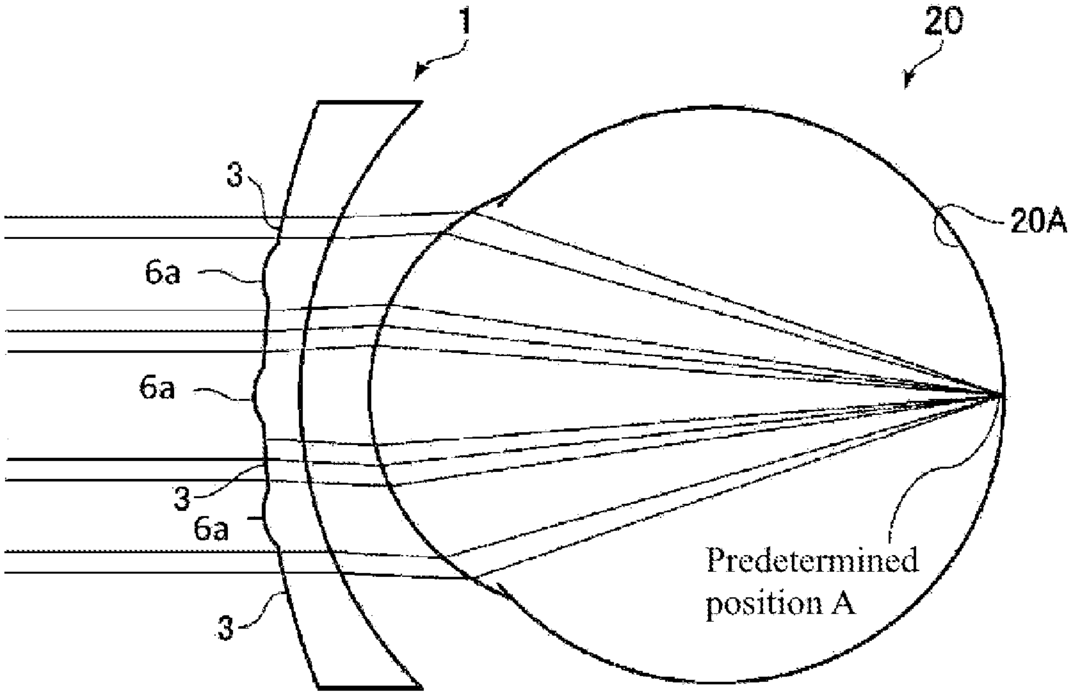
FIG. 3 is a schematic cross-sectional view showing a state in which, due to a portion other than the island-shaped coating-film convex portions (i.e., a base portion) in an eyeglass lens according to an aspect of the present disclosure, a pencil of rays that has entered from the object-side surface passes through the eye and converges at a position A on the retina after being emitted from the eyeball-side surface.

FIG. 3 is a schematic cross-sectional view showing a state in which, due to a portion other than the island-shaped coating-film convex portions 6*a* (i.e., the base portion) in an eyeglass lens 1 according to an aspect of the present disclosure, a pencil of rays that has entered from the object-side surface 3 converges at the position A on a retina 20A of an eyeball 20 after being emitted from the eyeball-side surface 4.

The eyeglass lens 1 according to an aspect of the present disclosure includes the lens substrate 2A. The lens substrate 2A also includes an object-side surface and an eyeball-side surface. The shapes of both surfaces of the lens substrate 2A may be determined according to the type of eyeglass lens 1, and may be a convex surface, a concave surface, a flat surface, or a combination thereof (e.g., a meniscus lens shown in this aspect as an example).

The eyeglass lens 1 is formed by providing a coating film to cover at least one of the object-side surface and the eyeball-side surface of the lens substrate 2A.

Minute convex portions are not formed on both the object side and the eyeball side of the lens substrate 2A according to an aspect of the present disclosure unlike the lens substrate 2A disclosed in Patent Document 1. This lens substrate 2A is coated with a coating film in which the outermost surface shape is provided with the island-shaped coating-film convex portions 6*a*. These island-shaped coating-film convex portions 6*a* cause a pencil of rays that has entered the eyeglass lens 1 to converge at the position B, which is closer to the object than the position A located on the retina is.

Figure 4:
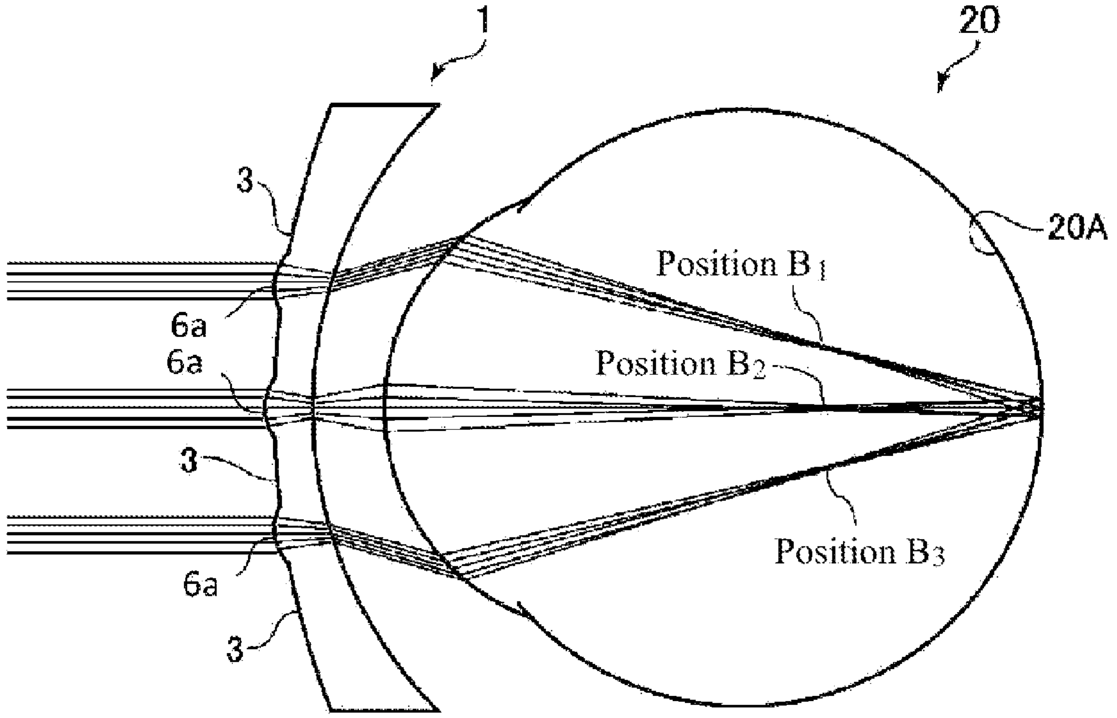
FIG. 4 is a schematic cross-sectional view showing a state in which, due to the island-shaped coating-film convex portion in an eyeglass lens according to an aspect of the present disclosure, a pencil of rays that has entered from the object-side surface converges at a position B that is closer to the object than the position A is after being emitted from the eyeball-side surface.

FIG. 4 is a schematic cross-sectional view showing a state in which, due to the island-shaped coating-film convex portion 6*a* in an eyeglass lens 1 according to an aspect of the present disclosure, a pencil of rays that has entered from the object-side surface 3 converges at the position B, which is closer to the object than the position A is, after being emitted from the eyeball-side surface 4. It should be noted that this convergence position B is present as positions $B_1$, $B_2$, $B_3$, . . . $B_N$ according to the plurality of island-shaped coating-film convex portions 6*a*. The convergence position B in this specification is an expression of the collection of the positions $B_1$, $B_2$, $B_3$, . . . $B_N$.

Aspects of the sizes and arrangement of the island-shaped coating-film convex portions 6*a* are not particularly limited, and can be determined from the viewpoint of external visibility of the island-shaped coating-film convex portions 6*a*, designability given by the island-shaped coating-film convex portions 6*a*, adjustment of the refractive power by the island-shaped coating-film convex portions 6*a*, and the like, for example. The island-shaped coating-film convex portions 6*a* may have a circular shape with a diameter d of about 0.8 to 2.0 mm in a plan view. The island-shaped coating-film convex portions 6*a* may have a maximum protruding length of 0.1 to 10 μm, for example, and may have a curvature radius of 50 to 250 mmR, for example. Moreover, the distance between the adjacent island-shaped coating-film convex portions 6*a* (the distance between the end portion of a certain island-shaped coating-film convex portion 6*a* and the end portion of an island-shaped coating-film convex portion 6*a* adjacent to the above-mentioned island-shaped coating-film convex portion 6*a*) may be substantially the same as the radius value of the island-shaped coating-film convex portion 6*a*, for example. The plurality of island-shaped coating-film convex portions 6*a* can be arranged substantially evenly in the vicinity of the center of the lens.

Case where Concentric Annular Portion 6*b* is Employed

The following describes the case where the concentric annular portion 6*b* is employed in an eyeglass lens 1 according to an aspect of the present disclosure.

Figure 5:
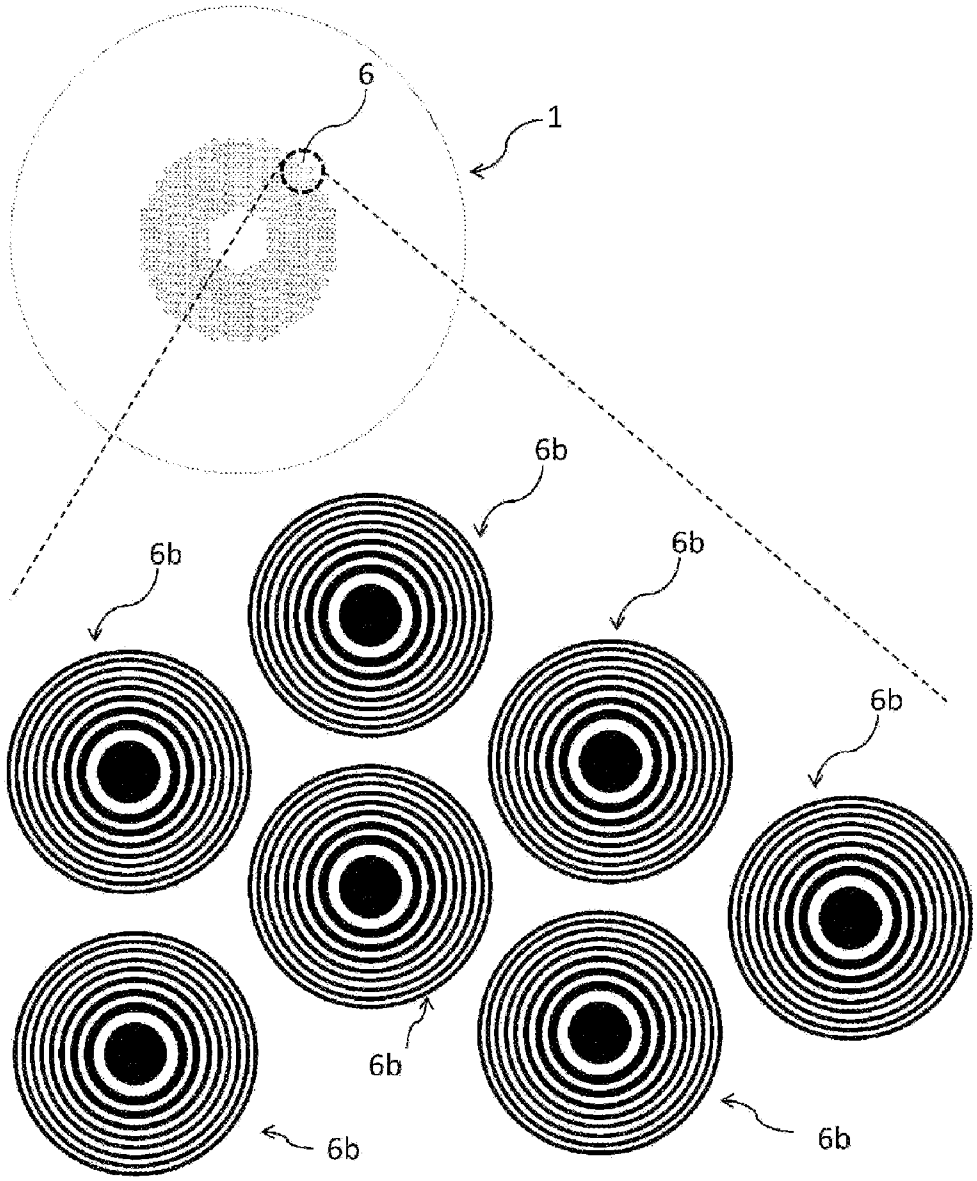
FIG. 5 is an enlarged schematic plan view showing an example in which the concentric annular portion including a plurality of ring zones is employed as the defocusing area in an eyeglass lens according to an aspect of the present disclosure.

FIG. 5 is an enlarged schematic plan view showing an example in which the concentric annular portion 6*b* is employed in an eyeglass lens 1 according to an aspect of the present disclosure.

As shown in FIG. 5, this aspect has a configuration in which the island-shaped coating-film convex portions 6*a* shown in FIGS. 1, 2, and 4 are changed to the concentric annular portions 6*b*. That is, in this aspect, the state in which the island-shaped coating-film convex portion 6*a* causes a pencil of rays to converge at the position B is reproduced using the concentric annular portion 6*b*.

As mentioned above, using the concentric annular portion 6*b* to form the defocusing area 6 makes it possible to reduce the maximum protruding length of the defocusing area 6 unlike the case where one island-shaped portion is formed. In order to exploit this advantage, it is preferable that the maximum protruding length of the ring zones included in the concentric annular portion 6*b* is smaller. For example, in order to reduce the maximum protruding length, it is preferable to set the diameter of the defocusing area 6 in a plan view when employing the concentric annular portion 6*b* to be smaller than that when employing the island-shaped coating-film convex portion 6*a*. Specifically, it is preferable to set the diameter of the defocusing area 6 in a plan view to 0.2 to 0.5 mm. In this case, it is preferable that the maximum protruding length of the ring zones included in the concentric annular portion 6*b* is 0.1 to 0.5 μm. Another regulation, namely $0.2\times10^{-3}\leq$(maximum protruding length of ring zones)/(diameter of defocusing area 6 in a plan view)$\leq2.5\times10^{-3}$, may also be employed. The lower limit value of this regulation may be set to zero when the case where the entire defocusing area 6 is recessed from the base portion is taken into consideration.

It should be noted that the plurality of concentric annular portions 6*b* can be arranged substantially evenly in the vicinity of the center of the lens as in the case of the island-shaped coating-film convex portions 6*a*.

Incidentally, the effect of suppressing the progress of a refractive error is obtained by causing a pencil of rays to converge at the position B, which is not located on the retina 20A, due to the minute convex portion as disclosed in Patent Document 1. It is also important to keep the ratio between light that converges at the position A and light that converges at the position B constant in order to obtain the effect of suppressing refractive error.

In the case of the concentric annular portion that forms a Fresnel pattern as shown in FIG. 2, the steps between the ring zones are relatively large. Therefore, in a portion that is dense with the defocusing areas 6, stray light caused by manufacturing errors is likely to occur, and thus light that converges at the position B is likely to be reduced. That is, the convergence efficiency may be reduced. It is preferable to adjust the area of the defocusing area such that the ratio between light that passes through the pupil and converges at the position A and light that passes through the pupil and converges at the position B corresponds to a predetermined set value.

Case where Substrate Convex Portions 2*a* are Formed on Lens Substrate 2A The following describes the case where the substrate convex portions 2*a* are formed on the lens substrate 2A in an eyeglass lens 1 according to an aspect of the present disclosure.

Figure 6A:
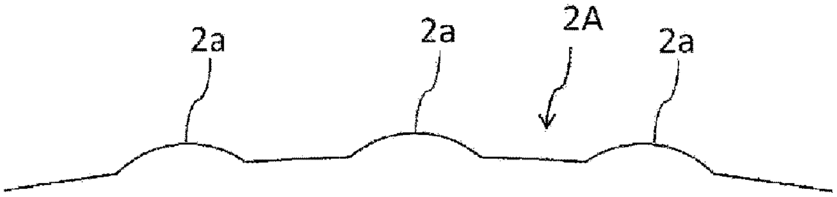
FIGS. 6A-6C show enlarged schematic cross-sectional views showing a state in which substrate convex portions are formed on a lens substrate of an eyeglass lens according to an aspect of the present disclosure, and the lens substrate is coated with the coating film.
Figure 6B:
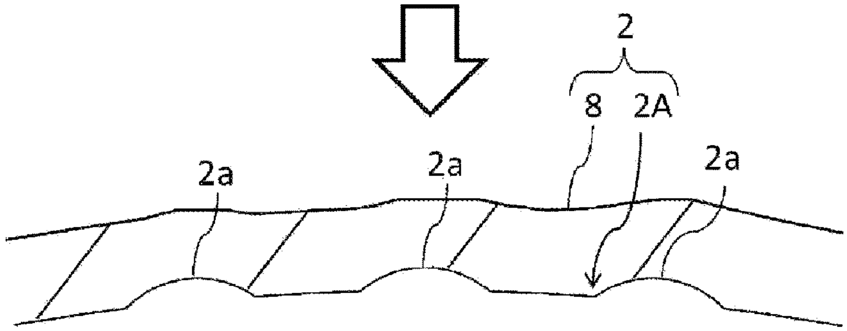
Figure 6C:
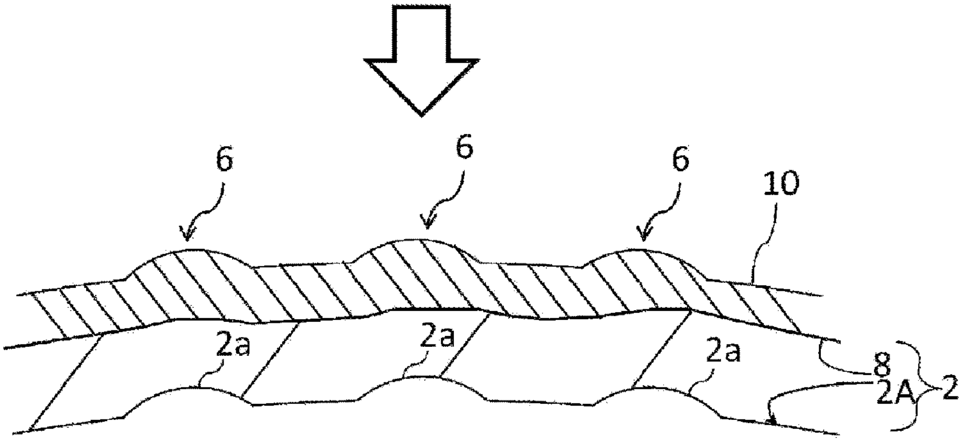

FIGS. 6A-6C show enlarged schematic cross-sectional views showing a state in which the substrate convex portions 2*a* are formed on the lens substrate 2A of an eyeglass lens 1 according to an aspect of the present disclosure, and the lens substrate 2A is coated with the coating film.

As shown in FIGS. 6A-6C, in the case where the substrate convex portions 2*a* are previously formed on the surface of the lens substrate 2A (FIG. 6A), when the lens substrate 2A is coated with a hard coating film 8 such that the hard coating film 8 is in contact with the lens substrate 2A, for example, the protruding lengths of the substrate convex portions 2*a* on the lens substrate 2A are reduced due to the influence of the coating film (i.e., the substrate convex portions 2A are flattened) (FIG. 6B).

Therefore, forming the defocusing areas 6 on the coating film and coating the lens substrate 2A, a hard coating film 8 thereon, or the like with the coating film as in this aspect (FIG. 6C) makes it possible to cause the focus position to be located at a position that is closer to the object than the position A is.

It should be noted that, as shown in FIG. 5, a configuration may be employed in which the substrate convex portions 2*a* are not arranged in a circular area with a radius of 2.5 to 10.0 mm around the optical center. On the contrary, a configuration may also be employed in which the substrate convex portions 2*a* are densely arranged in a circular area with a radius of 2.5 to 10.0 mm around the optical center. This regulation can also be applied to the case where the defocusing areas 6 are realized using the coating film without forming the substrate convex portions 2*a* as mentioned above.

Eyeglass Lens Coating Film

The technical ideas of the present disclosure are reflected in not only the eyeglass lenses 1 according to the above-listed aspects of the present disclosure but also an eyeglass lens coating film provided with the defocusing areas 6 in advance. The following is a description of the configuration thereof.

"A coating film for an eyeglass lens configured such that a pencil of rays that has entered from an object-side surface converges at a position A on a retina after being emitted from an eyeball-side surface, the coating film being provided with a plurality of defocusing areas that cause a pencil of rays to converge at a position B that is different from the position A in a light traveling direction."

It should be noted that the preferred example according to the coating film described relating to the eyeglass lenses 1 according to the above-listed aspects of the present disclosure can also be applied to this eyeglass lens coating film.

Method for Manufacturing Eyeglass Lens 1

The technical ideas of the present disclosure are reflected in not only the eyeglass lenses 1 according to the above-listed aspects of the present disclosure but also a method for manufacturing the eyeglass lens 1 in view of obtaining the effect of suppressing refractive error by coating the lens substrate 2A with an eye glass lens coating film provided with the defocusing areas 6 in advance. The following is a description of the configuration thereof.

"A method for manufacturing an eyeglass lens configured such that a pencil of rays that has entered from an object-side surface converges at a position A on a retina after being emitted from an eyeball-side surface, the method comprising a coating step of coating a lens substrate portion with a coating film provided with a plurality of defocusing areas that cause a pencil of rays to converge at a position B that is different from the position A."

Incidentally, the following further describes a functional aspect of the present disclosure.

"A method for manufacturing an eyeglass lens configured such that a pencil of rays that has entered from an object-side surface converges at a position A on a retina after being emitted from an eyeball-side surface, the method comprising an addition step of adding a function of causing a pencil of rays to converge at a position B that is different from the position A in a light traveling direction to an outermost surface of a lens substrate portion."

In an aspect of the present disclosure, the above-mentioned addition step is a coating step of coating the above-mentioned lens substrate portion with a coating film provided with a plurality of defocusing areas that cause a pencil of rays to converge at the position B, which is different from the above-mentioned position A.

It should be noted that the preferred example according to the coating film described relating to the eyeglass lenses 1 according to the above-listed aspects of the present disclosure can also be applied to this method for manufacturing the eyeglass lens 1.

The following describes specific contents other than the above-described contents.

Lens Substrate 2A

As mentioned above, the surface of the lens substrate 2A may or may not be provided with the substrate convex portions 2*a*. If the substrate convex portions 2*a* are provided, an aspect below may also be employed. Of course, aspects (e.g., material) other than that of the substrate convex portion 2*a* below can also be applied to the case where a conventional lens substrate 2A in which the surface of the lens substrate 2A is not provided with the substrate convex portions 2*a* is employed.

Aspects of the size of the substrate convex portion 2*a* and the arrangement of the plurality of substrate convex portions 2*a* on the surface of the lens substrate 2A are not particularly limited. The specific size and the like may be the same as those described in "Case Where Island-Shaped Coating-Film Convex Portion 6*a* Is Employed" above.

Various lens substrates 2A that are commonly used in eyeglass lenses 1 can be used as the lens substrate 2A. For example, the lens substrate 2A may be a plastic lens substrate or a glass lens substrate. The glass lens substrate may be a lens substrate made of inorganic glass, for example. The plastic lens substrate is preferable as the lens substrate 2A from the viewpoint that it is light and is not likely to be broken. Examples of the plastic lens substrate include styrene resins such as (meth)acrylic resins, polycarbonate resins, allyl resins, allyl carbonate resins such as a diethylene glycol bis allyl carbonate resin (CR-39), vinyl resins, polyester resins, polyether resins, urethane resins obtained through reactions between an isocyanate compound and a hydroxy compound such as diethylene glycol, thiourethane resins obtained through reactions between an isocyanate compound and a polythiol compound, and cured substances (commonly called "transparent resins") obtained by curing curable compositions containing a (thio)epoxy compound having one or more disulfide bonds in the molecule. The curable compositions may be referred to as "polymerizable compositions". The lens substrate 2A may be an uncolored lens substrate (colorless lens) or a colored lens substrate (colored lens). There is no particular limitation on the thickness and the diameter of the lens substrate 2A. For example, the thickness (central thickness) may be about 1 to 30 mm, and the diameter may be about 50 to 100 mm. The lens substrate 2A may have a refractive index of about 1.60 to 1.75, for example. However, the refractive index of the lens substrate 2A is not limited to the above-mentioned range, and may be within the above-mentioned range, or may be larger or smaller than the above-mentioned range. The refractive index as used in the present disclosure and this specification refers to a refractive index for light at a wavelength of 500 nm. The lens substrate 2A can be molded through a known molding method such as casting polymerization. For example, by molding a lens substrate 2A through casting polymerization using a mold having a molding face provided with a plurality of concave portions, a lens substrate 2A provided with the substrate convex portions 2*a* on at least one surface is obtained.

Coating Film

The lens substrate 2A may be provided with a λ/4 film (not shown) that is in contact with the lens substrate 2A, the hard coating film 8 provided on the λ/4 film, and the antireflection film 10 provided on the hard coating film 8. The materials of these films may be different from that of the lens substrate, and may be provided as transparent layers.

There is no limitation on the λ/4 film as long as the λ/4 film is a film that has an optical thickness of λ/4, and a film that is used for an antireflection filter or the like may also be used. In one specific example, a urethane resin (having a refractive index n of 1.54) may be used for the λ/4 film, and the thickness thereof may be 70 to 90 nm.

There is no particular limitation on the hard coating film 8 as long as the scratch resistance of the eyeglass lens 1 is improved. In one specific example, a silicon compound (having a refractive index n of 1.50) may be used for the hard coating film 8, and the thickness thereof may be 1.5 to 1.9 μm.

A known material may be used as the material of the antireflection film 10.

It is preferable that the refractive index of the lens substrate 2A is higher than that of the λ/4 film, and the refractive index of the λ/4 film is higher than that of the hard coating film 8.

An aspect of a coating film to be provided on the surface of the lens substrate 2A is a cured film formed by curing a curable composition containing a curable compound. Such a cured film is commonly called a hard coating film 8, and contributes to the improvement in durability of the eyeglass lens 1. A curable compound means a compound having a curable functional group, and a curable composition means a composition containing one or more curable compounds.

An aspect of the curable composition for forming the above-mentioned cured film may be a curable composition containing an organic silicon compound as the curable compound, or a curable composition containing metal oxide particles together with the organic silicon compound. An example of the curable composition that can form the above-mentioned curable film is a curable composition disclosed in JP S63-10640A.

An aspect of the organic silicon compound may be an organic silicon compound represented by General Formula (I) below or a hydrolyzed product thereof.

$$(R^1)_a(R^3)_bSi(OR^2)_{4-(a+b)} \quad \text{(I)}$$

In General Formula (I), $R^1$ represents an organic group having a glycidoxy group, an epoxy group, a vinyl group, a methacryloxy group, an acryloxy group, a mercapto group, an amino group, a phenyl group, or the like, $R^2$ represents an alkyl group having 1 to 4 carbon atoms, an acyl group having 1 to 4 carbon atoms, or an aryl group having 6 to 10 carbon atoms, $R^3$ represents an alkyl group having 1 to 6 carbon atoms or an aryl group having 6 to 10 carbon atoms, and a and b independently represent 0 or 1.

The alkyl group having 1 to 4 carbon atoms represented by $R^2$ is a linear or branched alkyl group, and specific examples thereof include a methyl group, an ethyl group, a propyl group, and a butyl group.

Examples of the acyl group having 1 to 4 carbon atoms represented by $R^2$ include an acetyl group, a propionyl group, an oleyl group, and a benzoyl group.

Examples of the aryl group having 6 to 10 carbon atoms represented by $R^2$ include a phenyl group, a xylyl group, and tolyl group.

The alkyl group having 1 to 6 carbon atoms represented by $R^3$ is a linear or branched alkyl group, and specific examples thereof include a methyl group, an ethyl group, a propyl group, a butyl group, a pentyl group, and a hexyl group.

Examples of the aryl group having 6 to 10 carbon atoms represented by $R^3$ include a phenyl group, a xylyl group, and tolyl group.

Specific examples of the compound represented by General Formula (I) above include compounds disclosed in paragraph [0073] of JP 2007-077327A. Since the organic silicon compound represented by General Formula (I) has a curable group, the hard coating film 8 can be formed as the cured film by performing curing processing after the application of such an organic silicon compound.

The metal oxide particles can contribute to the adjustment of the refractive index of the cured film and the improvement of the hardness thereof. The specific examples of the metal oxide particles include tungsten oxide ($WO_3$) particles, zinc oxide (ZnO) particles, silicon oxide ($SiO_2$) particles, aluminum oxide ($Al_2O_3$) particles, titanium oxide ($TiO_2$) particles, zirconium oxide ($ZrO_2$) particles, tin oxide ($SnO_2$) particles, beryllium oxide (BeO) particles, and antimony oxide (S0205) particles, and these particles can be used alone or in combination of two or more types. It is preferable that the metal oxide particles have a particle diameter within a range from 5 to 30 nm from the viewpoint of achieving both the scratch resistance and the optical properties in the cured film. The content of the metal oxide particles in the curable composition can be determined as appropriate in consideration of the refractive index and the hardness of a cured film to be formed, and may be commonly set to about 5 to 80 mass % of the solid content in the curable composition. It is preferable that the metal oxide particles are colloidal particles from the viewpoint of the dispersibility in the cured film.

The above-mentioned cured film can be formed, for example, by forming a coated film through direct application of a curable composition prepared by mixing the above-mentioned components and optionally optional components such as an organic solvent, a surfactant (leveling agent), and a curing agent, onto the surface of the lens substrate 2A, or indirect application thereof onto the surface of the lens substrate 2A via another film, and performing curing processing (e.g., heating and/or light irradiation) on this coated film according to the curable compound. Details of the application of the curable composition will be described later. For example, when heating is performed as the curing processing, a curing reaction of the curable compound in the coated film is caused to progress by placing the lens substrate 2A provided with the coated film formed of the curable composition under the environment at an atmospheric temperature of 50 to 150° C. for about 30 minutes to 2 hours.

The curable composition for forming a coating film on the surface of the lens substrate 2A preferably has a viscosity in a range from 1 to 50 mPa·s, more preferably a range from 1 to 40 mPa·s, and even more preferably a range from 1 to 20 mPa·s, from the viewpoint that the composition can be suitably applied through spin coating. The viscosity as used in the present disclosure and this specification refers to the viscosity at a liquid temperature of 25° C.

Also, an aspect of the coating film formed on the surface of the lens substrate 2A is a coating film that is commonly called a primer film and contributes to improving adherence between layers. Examples of a coating liquid capable of forming such a coating film include compositions (referred to as "dry solidifiable compositions" hereinafter) in which a resin component such as a polyurethane resin is dispersed in a solvent (water, an organic solvent, or a mixed solvent thereof). Solidification of such a composition proceeds by removing a solvent through drying. Drying can be performed through a drying process such as air drying or heat drying.

The dry solidifiable composition for forming a primer layer on the surface of the lens substrate 2A preferably has a viscosity in a range from 1 to 50 mPa·s, more preferably a range from 1 to 40 mPa·s, and even more preferably a range from 1 to 20 mPa·s, from the viewpoint of application suitability for spin coating.

Supply of Coating Liquid

A coating liquid for forming a coating film on the surface of the lens substrate 2A is supplied through spin coating. In the case where the substrate convex portions 2*a* are formed, applying the coating liquid through spin coating makes it possible to inhibit a coating film from having an uneven film thickness due to the liquid building up around the substrate convex portions 2*a*. The coating liquid can be applied through spin coating by placing the lens substrate 2A in a spin coater with the surface thereof facing vertically upward, and supplying the coating liquid onto the surface from above (e.g., discharging the coating liquid from a nozzle arranged above the surface) while rotating the lens substrate 2A on the spin coater, for example. Here, the rotational speed of the lens substrate 2A during the spin coating is preferably in a range from 10 to 3000 rpm (rotations per minute), more preferably in a range from 50 to 2500 rpm, and even more preferably in a range from 100 to 2000 rpm, from the viewpoint of forming a coating film having a more even thickness.

It is possible to form a coating film by performing processing (e.g., curing processing or drying processing) according to the type of coating liquid after the coating liquid has been applied.

The film thickness of the coating film formed through the above-described steps may be in a range of 0.5 to 100 μm, for example. However, the film thickness of the coating film is determined depending on the functions required for the coating film, and is not limited to the above-mentioned exemplary range.

Examples of such a coating film include various coating films (e.g., a hard coating film 8, a primer film, an antireflection film 10, an antifouling film, and an antifogging film) that are commonly provided on an eyeglass lens 1. A known technique can be applied to a method for forming these coating films.

The defocusing areas that cause a pencil of rays to converge at the position B, which is different from the position A, may be provided to the above-mentioned coating film. For example, the defocusing areas 6 may be formed on the surface of the coating film by curing the coating film in a state in which a master plate corresponding to the shape of the defocusing area 6 during curing processing and releasing the master plate.

On the other hand, one or more additional coating films can also be provided on the above-mentioned coating film provided with the defocusing areas 6. Examples of such coating films include various coating films such as an antireflection film 10, a water repellent or hydrophilic anti-fouling film, and an antifogging film. A known technique can also be applied to a method for forming the one or more additional coating films.

The technical ideas of the eyeglass lenses 1 of the above-described aspects of the present disclosure can also be applied to eyeglass lenses 1 having a function of suppressing the progress of far-sightedness. Specifically, a defocusing area 6 is configured to have a function of causing a pencil of rays to converge at a position B' that is farther away from the object in a light traveling direction than a position A located on the retina is (i.e., a position B' that is located on the rear side with respect to the position A). Moreover, if the function of suppressing the progress of far-sightedness is also imparted to the lens substrate portion 2, the "convex shape" of the substrate convex portion 2*a* is changed to a "concave shape". By changing the "convex shape" to a "concave shape" in the eyeglass lenses 1 of the above-described aspects of the present disclosure and changing the configuration such that a pencil of rays converges at the position B', which is farther away from the object than the predetermined position A is, eyeglass lenses 1 having a function of suppressing the progress of far-sightedness can be obtained.

Although the disclosure achieved by the inventor of the present disclosure has been specifically described based on the embodiments, the present disclosure should not be limited to the above-mentioned embodiments, and it goes without saying that various modifications can be made without departing from the gist of the present disclosure.

The embodiments disclosed herein are exemplary in all respects, and should be construed as being not limitative. The scope of the present disclosure is defined not by the aforementioned descriptions but by the scope of the appended claims, and all changes that fall within the same essential spirit as the scope of the claims are intended to be included therein as well.

Summary

"The eyeglass lens, the method for manufacturing an eyeglass lens, and the eyeglass lens coating film" of the present disclosure will be summarized below.

The following is an example of the present disclosure:

an eyeglass lens 1 configured such that a pencil of rays that has entered from an object-side surface 3 passes through an eye and converges at a position A on a retina after being emitted from an eyeball-side surface, wherein a function of causing a pencil of rays to converge at a position B that is different from the position A in a light traveling direction is added to a surface of a lens substrate portion 2.

LIST OF REFERENCE NUMERALS

1 Eyeglass lens
2 Lens substrate portion
2A Lens substrate
2*a* Substrate convex portion
3 Object-side surface (convex surface)
4 Eyeball-side surface (concave surface)
6 Defocusing area
6*a* Island-shaped coating-film convex portion
6*b* Concentric annular portion
8 Hard coating film
10 Antireflection film
20 Eyeball
20A Retina

The invention claimed is:

1. An eyeglass lens configured to cause a first pencil of rays that travel in a light traveling direction and enter the eyeglass lens at an object side of the eyeglass lens to exit the eyeglass lens from an eyeball side of the eyeglass lens and converge at a predetermined position A, the eyeglass lens comprising:

a lens substrate;

a hard coat provided on the lens substrate; and a structure added on the hard coat, wherein the structure is a coating film provided with a plurality of defocusing areas so that a second pencil of rays incident on each of the defocusing areas converge at a corresponding one of a plurality of positions B that are different from the position A for fulfilling a prescription of a wearer, the coating film is made of a material that is different from a material of the lens substrate, the position A is at the retina and the plurality of positions B is not at the retina, and each defocusing area of the plurality of defocusing areas includes a plurality of concentric annular ring zones, the plurality of concentric annular ring zones being arranged to form steps between adjacent ring zones among the plurality of concentric annular ring zones such that the plurality of defocusing areas form a diffraction pattern.

2. The eyeglass lens according to claim 1, wherein the coating film is a transparent layer made of the material that is different from the material of the lens substrate.

3. The eyeglass lens according to claim 1, wherein the diffraction pattern is a Fresnel pattern.

4. The eyeglass lens according to claim 1, wherein an antireflection film is arranged on an outermost surface of the coating film.

5. The eyeglass lens according to claim 1, wherein, for each defocusing area of the plurality of defocusing areas, the lens substrate underlying the defocusing area is configured to cause an incoming pencil of rays that travel in a light traveling direction to converge, in the absence of the defocusing area, at the position A.

6. The eyeglass lens according to claim 1, wherein each of the defocusing areas has a convex portion.

7. The eyeglass lens according to claim 1, wherein the defocusing areas have a diameter of about 0.8 to 2.0 mm in a plan view.

8. The eyeglass lens according to claim 1, wherein each position B is closer than the position A to the object side.

9. The eyeglass lens according to claim 1, further comprising a base portion having a function to cause a pencil of rays entered from the object-side surface to converge at the position A on the retina of the wearer.

10. The eyeglass lens according to claim 1, wherein the lens substrate comprises a convex portion.

11. A method for manufacturing an eyeglass lens configured to cause a first pencil of rays that travel in a light traveling direction and enter the eyeglass lens at an object side of the eyeglass lens to exit the eyeglass lens from an eyeball side of the eyeglass lens and converge at a predetermined position A, the method comprising:

providing a hard coat on a lens substrate; and
adding a structure on the hard coat, wherein
the structure is a coating film provided with a plurality of defocusing areas so that a second pencil of rays incident on each of the defocusing areas converge at a corresponding one of a plurality of positions B that are different from the position A for fulfilling a prescription of a wearer,
the coating film is made of a material that is different from a material of the lens substrate,
the position A is at the retina and the plurality of positions B is not at the retina, and
each defocusing area of the plurality of defocusing areas includes a plurality of concentric annular ring zones, the plurality of concentric annular ring zones being arranged to form steps between adjacent ring zones among the plurality of concentric annular ring zones such that the plurality of defocusing areas form a diffraction pattern.

12. The method for manufacturing an eyeglass lens according to claim 11, wherein the coating film is a transparent sheet, and
wherein the adding comprises bonding the sheet to the lens substrate provided with the hard coat.

13. The method for manufacturing an eyeglass lens according to claim 11, wherein the diffraction pattern is a Fresnel pattern.

* * * * *